US012334656B2

(12) United States Patent
Wang

(10) Patent No.: US 12,334,656 B2
(45) Date of Patent: Jun. 17, 2025

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Zedong Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 228 days.

(21) Appl. No.: 18/346,432

(22) Filed: Jul. 3, 2023

(65) Prior Publication Data

US 2023/0344133 A1 Oct. 26, 2023

Related U.S. Application Data

(63) Continuation of application No. PCT/CN2021/130363, filed on Nov. 12, 2021.

(30) Foreign Application Priority Data

Jan. 7, 2021 (CN) ......................... 202110021880.0

(51) Int. Cl.
*H01Q 9/04* (2006.01)
*H01Q 1/22* (2006.01)

(52) U.S. Cl.
CPC ............. *H01Q 9/0457* (2013.01); *H01Q 1/22* (2013.01)

(58) Field of Classification Search
CPC .......... H01Q 5/30; H01Q 5/335; H01Q 5/342; H01Q 9/0407; H01Q 9/0442; H01Q 9/0457
See application file for complete search history.

(56) References Cited

U.S. PATENT DOCUMENTS 9,124,006 B2 9/2015 Ding
2004/0145525 A1 7/2004 Annabi et al.
(Continued)

FOREIGN PATENT DOCUMENTS

CN 203225342 10/2013
CN 105305046 2/2016
(Continued)

OTHER PUBLICATIONS

CNIPA, First Office Action for CN Application No. 202110021880.0, Nov. 28, 2022.
(Continued)

*Primary Examiner* — Jason M Crawford
(74) *Attorney, Agent, or Firm* — Hodgson Russ LLP

(57) ABSTRACT

An antenna assembly and an electronic device are provided. The antenna assembly includes a substrate, a radiating patch, and a matching structure. The radiating patch is disposed on the substrate. The matching structure is configured to be electrically connected with a radio frequency (RF) signal circuit at one end of the matching structure, and the matching structure is provided with a first coupling piece at the other end of the matching structure. The first coupling piece is in capacitive coupling with the radiating patch. The first coupling piece is configured to feed a RF signal generated by the RF signal circuit into the radiating patch, to excite the radiating patch to generate multiple resonant modes. At least one resonant mode in the multiple resonant modes is generated by the capacitive coupling between the first coupling piece and the radiating patch.

20 Claims, 11 Drawing Sheets

(56) References Cited

U.S. PATENT DOCUMENTS

| | | | | |
|---|---|---|---|---|
| 2013/0194149 | A1* | 8/2013 | Kimura | H01Q 9/16 343/822 |
| 2016/0028152 | A1* | 1/2016 | Anguera Pros | H01Q 1/38 |
| 2020/0021011 | A1 | 1/2020 | Cooper et al. | |
| 2022/0102841 | A1* | 3/2022 | Jia | H01Q 19/062 |
| 2022/0216615 | A1* | 7/2022 | Jia | H01Q 1/243 |
| 2022/0255240 | A1* | 8/2022 | Jia | H01Q 21/30 |
| 2023/0344133 | A1* | 10/2023 | Wang | H01Q 1/22 |
| 2023/0344151 | A1* | 10/2023 | Wu | H01Q 9/42 |
| 2023/0344152 | A1* | 10/2023 | Wu | H01Q 1/521 |
| 2023/0361470 | A1* | 11/2023 | Wu | H01Q 5/335 |
| 2024/0021998 | A1* | 1/2024 | Wang | H01Q 5/335 |
| 2024/0072418 | A1* | 2/2024 | Wu | H03H 7/38 |
| 2024/0072440 | A1* | 2/2024 | Wu | H01Q 5/364 |

FOREIGN PATENT DOCUMENTS

| | | |
|---|---|---|
| CN | 110247175 | 9/2019 |
| CN | 111403901 | 7/2020 |
| CN | 211350966 | 8/2020 |
| CN | 111769362 | 10/2020 |
| CN | 111799545 | 10/2020 |
| TW | I714410 | 12/2020 |
| WO | 2019189050 | 10/2019 |
| WO | 2020145392 | 7/2020 |
| WO | 2020173294 | 9/2020 |

OTHER PUBLICATIONS

Jaiverdhan et al., "Analysis of Dual Band Double Slot Loaded Microstrip Patch Antenna," 2017 International Conference on Computer, Communications and Electronics (Comptelix), Jul. 2017.

WIPO, International Search Report and Written Opinion for International Application No. PCT/CN2021/130363, Dec. 20, 2021.

EPO, Extended European Search Report for EP Application No. 21917171.7, Jun. 4, 2024.

* cited by examiner

ANTENNA ASSEMBLY AND ELECTRONIC DEVICE

CROSS-REFERENCE TO RELATED APPLICATIONS

This application is a continuation of International Application No. PCT/CN2021/130363, filed Nov. 12, 2021, which claims priority to Chinese Patent Application No. 202110021880.0, filed Jan. 7, 2021, the entire disclosures of which are incorporated herein by reference.

TECHNICAL FIELD

This disclosure relates to the field of communication technology, and in particular to an antenna assembly and an electronic device.

BACKGROUND

With development of communication technologies, electronic devices with communication functions become increasingly popular and increasingly powerful. The electronic device generally includes an antenna for realizing the communication function of the electronic device. How to improve a communication quality of the electronic device becomes a technical problem to be solved.

SUMMARY

An antenna assembly and an electronic device that improve a communication quality are provided in the present disclosure.

In a first aspect, an antenna assembly is provided in implementations of the present disclosure. The antenna assembly includes a substrate, a radiating patch, and a matching structure. The radiating patch is disposed on the substrate. The matching structure is configured to be electrically connected with a radio frequency (RF) signal circuit, and the matching structure includes a first coupling piece at the other end of the matching structure. The first coupling piece is in capacitive coupling with the radiating patch. The first coupling piece is configured to feed a RF signal generated by the RF signal circuit into the radiating patch, to excite the radiating patch to generate multiple resonant modes. At least one resonant mode in the multiple resonant modes is generated by the capacitive coupling between the first coupling piece and the radiating patch.

In a second aspect, an electronic device is provided in implementations of the present disclosure. The electronic device includes an antenna assembly. The antenna assembly includes a substrate, a radiating patch, and a matching structure. The radiating patch is disposed on the substrate. The matching structure is configured to be electrically connected with a RF signal circuit, and the matching structure includes a first coupling piece at the other end of the matching structure. The first coupling piece is in capacitive coupling with the radiating patch. The first coupling piece is configured to feed a RF signal generated by the RF signal circuit into the radiating patch, to excite the radiating patch to generate multiple resonant modes. At least one resonant mode in the multiple resonant modes is generated by the capacitive coupling between the first coupling piece and the radiating patch.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

To explain technical solutions in implementations of the present disclosure more clearly, the following will give a brief introduction to accompanying drawings which are needed to be used in description of the implementations or the related art. Apparently, the accompanying drawings in the following description are merely some implementations of the present disclosure. For those skilled in the art, other accompanying drawings can be obtained according to these accompanying drawings without creative efforts.

DETAILED DESCRIPTION

Technical solutions in implementations of the present disclosure will be described clearly and completely hereinafter with reference to the accompanying drawings in implementations of the present disclosure. Apparently, the described implementations are merely some rather than all implementations of the present disclosure. Implementations listed in the present disclosure may be appropriately combined with each other.

Figure 1:
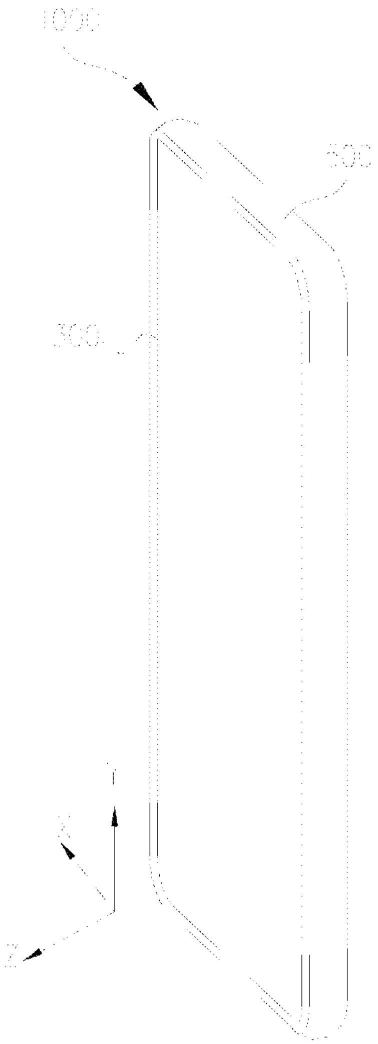
FIG. 1 is a schematic structural diagram of an electronic device provided in implementations of the present disclosure.

Referring to FIG. 1, FIG. 1 is a schematic structural diagram of an electronic device 1000 provided in implementations of the present disclosure. The electronic device 1000 may be a telephone, a television, a tablet computer, a mobile phone, a camera, a personal computer, a notebook computer, an on-board device, an earphone, a watch, a wearable device, a base station, an on-board radar, a customer premise equipment (CPE), and other devices capable of transmitting and receiving electromagnetic wave signals. The mobile phone is taken as an example of the electronic device 1000. For ease of description, the electronic device 1000 is defined with reference to a first view angle. A width direction of the electronic device 1000 is defined as direction X, a length direction of the electronic device 1000 is defined as direction Y, and a thickness direction of the electronic device 1000 is defined as direction Z. A direction indicated by an arrow is forward.

Figure 2:
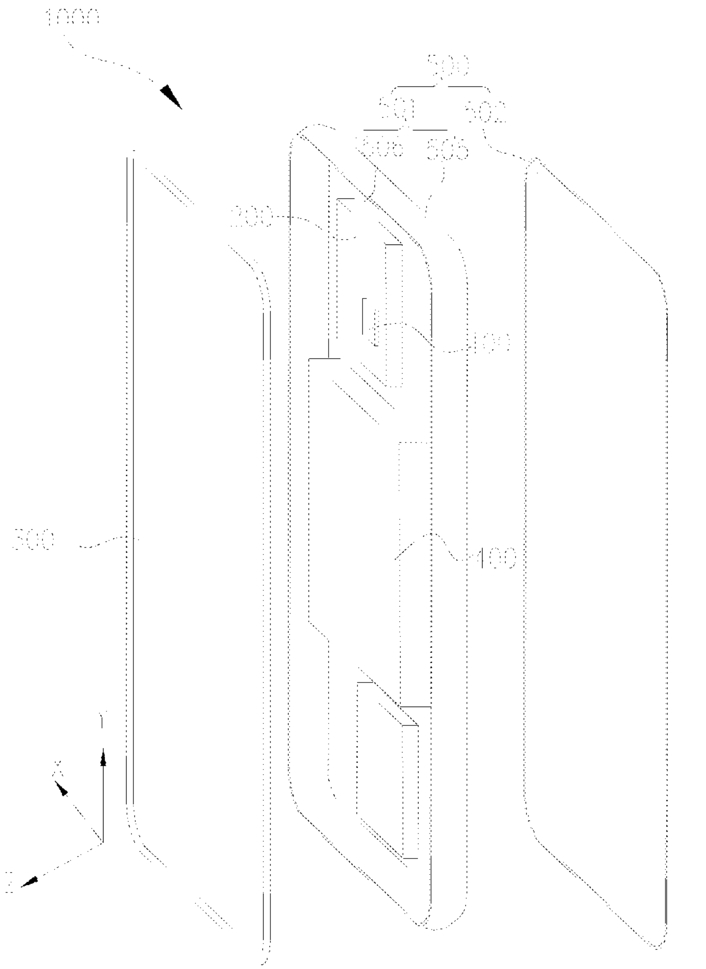
FIG. 2 is an exploded schematic structural diagram of the electronic device provided in FIG. 1.

Referring to FIG. 2, the electronic device 1000 provided in implementations of the present disclosure includes a display screen 300 and a housing 500 covering the display screen 300. The housing 500 includes a middle frame 501 and a rear cover 502 covering the middle frame 501. The rear cover 502 is disposed at one side of the middle frame 501 away from the display screen 300. The middle frame 501 includes a middle plate 506 and an edge frame 505 that surrounds and is connected with a periphery of the middle plate 506. Electronic components such as a main board 200, a battery 400, etc., are disposed on the middle plate 506. An edge of the display screen 300, the edge frame 505, and the rear cover 502 are connected in sequence. The edge frame 505 and the rear cover 502 may be integrally formed. In other implementations, the electronic device 1000 may not include the display screen 300.

Referring to FIG. 2, the electronic device 1000 further includes an antenna assembly 100. The antenna assembly 100 is configured to transmit and receive a radio frequency (RF) signal to realize a communication function of the electronic device 1000.

Figure 3:
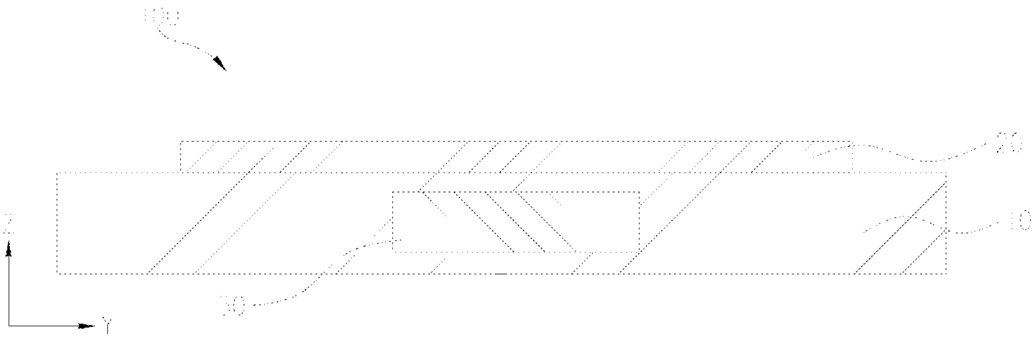
FIG. 3 is a schematic structural diagram of an antenna assembly in FIG. 2 provided in implementations of the present disclosure.
Figure 4:
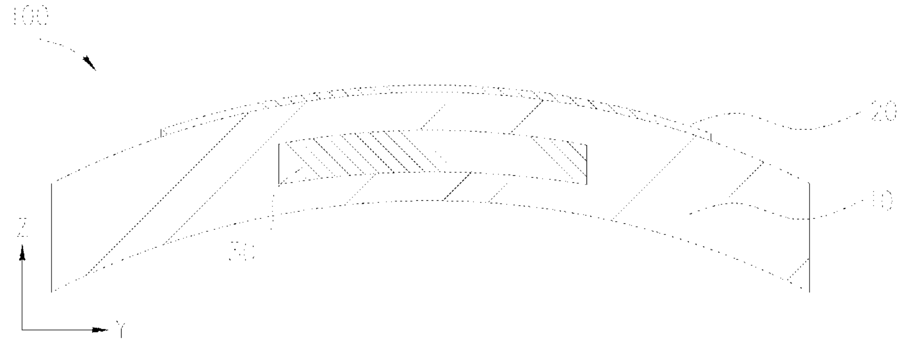
FIG. 4 is a schematic structural diagram of an antenna assembly in FIG. 2 provided in other implementations of the present disclosure.

Referring to FIG. 3 and FIG. 4, the antenna assembly 100 includes a substrate 10, a radiating patch 20, and a matching structure 30.

The substrate 10 is also known as a dielectric substrate. Optionally, the substrate 10 may be a rigid substrate to have a relatively good support strength. The substrate 10 may also be a flexible substrate to facilitate arbitrary bending and adapt to an irregular space and a curved space of a special shape. When the substrate 10 is disposed in a special-shaped space, a utilization rate of the antenna assembly for the special-shaped space in the electronic device 1000 can be improved, thereby promoting compactness of an internal structure of the electronic device 1000 and promoting miniaturization of the electronic device 1000.

Optionally, the substrate 10 may be formed by a single dielectric layer or multiple dielectric layers. Materials of the multiple dielectric layers are not specifically limited in the present disclosure. Optionally, a material of the substrate 10 is selected from a group consisting of a liquid crystal high polymer, polyimide, polytetrafluoroethylene, or ceramic, and may also be a mixture of a high polymer material, ceramic, and high polymer that have relatively little loss tangent.

Figure 5:
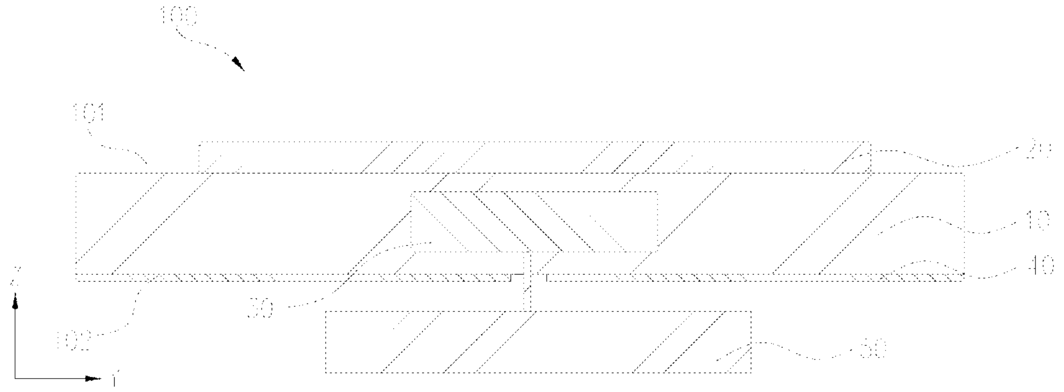
FIG. 5 is a schematic structural diagram of an antenna assembly in FIG. 2 provided in other implementations of the present disclosure.

Referring to FIG. 5, the substrate 10 includes a top surface 101 and a bottom surface 102 opposite to each other. When the antenna assembly 100 is disposed in the electronic device 1000, the top surface 101 faces the outside of the electronic device 1000 with respect to the bottom surface 102. The radiating patch 20 is disposed on the top surface 101 of the substrate 10.

Further, referring to FIG. 5, the antenna assembly 100 further includes a reference ground layer 40 disposed on the bottom surface 102 of the substrate 10. The radiating patch 20 is made of a conductive material. The radiating patch 20 is a port of the antenna assembly 100 for transmitting and receiving an electromagnetic wave signal. The material of the radiating patch 20 is not specifically limited in the present disclosure. For example, the material of the radiating patch 20 includes, but is not limited to, metal, transparent conductive oxide (e.g., indium tin oxide (ITO)), a carbon nanotube, graphene, a conductive polymer, and the like. In this implementation, the radiating patch 20 is made of metal.

The radiating patch 20 may be molded on the top surface 101 of the substrate 10 by processes such as coating, plating, atomic layer deposition, screen printing, laser molding, chemical vapor deposition, physical vapor deposition, and the like. Specifically, the radiating patch 20 may be molded by forming a metal paste on the top surface 101 of the substrate 10 and by processes such as baking, sintering, and the like, or the radiating patch 20 may be pasted or pressed on the top surface 101 of the substrate 10 in a patch form. Specifically, a shape of the radiating patch 20 includes, but is not limited to, a rectangle, an ellipse, a cross, a rhombus, and the like. The radiating patch 20 may be a solid patch, a patch that is hollow at an interior of the patch, or a patch that is hollow at an edge of the patch.

The reference ground layer 40 is made of a conductive material, and further, the reference ground layer 40 is made of a metal material. For a process of molding the reference ground layer 40 on the bottom surface 102 of the substrate 10, reference may be made to a process of molding the radiating patch 20 on the top surface 101 of the substrate 10.

Optionally, the matching structure 30 is embedded in the substrate 10. In other implementations, the matching structure 30 may also be disposed on an outer surface of the substrate 10 or a region outside the substrate 10.

In an implementation, referring to FIG. 5, the antenna assembly 100 further includes a RF signal circuit 50 disposed at one side of the reference ground layer 40 away from the radiating patch 20. The RF signal circuit 50 is configured to generate a RF signal. Specifically, the RF signal circuit 50 may be disposed on the main board 200, or disposed in the housing 500 and electrically connected with the main board 200 (referring to FIG. 2). The RF signal circuit 50 may be an application specific integrated circuit (ASIC). The substrate 10 is disposed in the housing 500. A specific position of the substrate 10 in the housing 500 is not limited in the present disclosure, and includes, but is not limited to, positions such as adhered to an inner surface of the housing 500, supported by a support plate, disposed on the main board 200, and the like. When the housing 500 is a curved housing and the inner surface of the housing 500 is a curved surface, the substrate 10 may be attached to the curved surface to be disposed in a curved-surface space, such that the curved-surface space in the electronic device 1000 is fully utilized.

Figure 6:
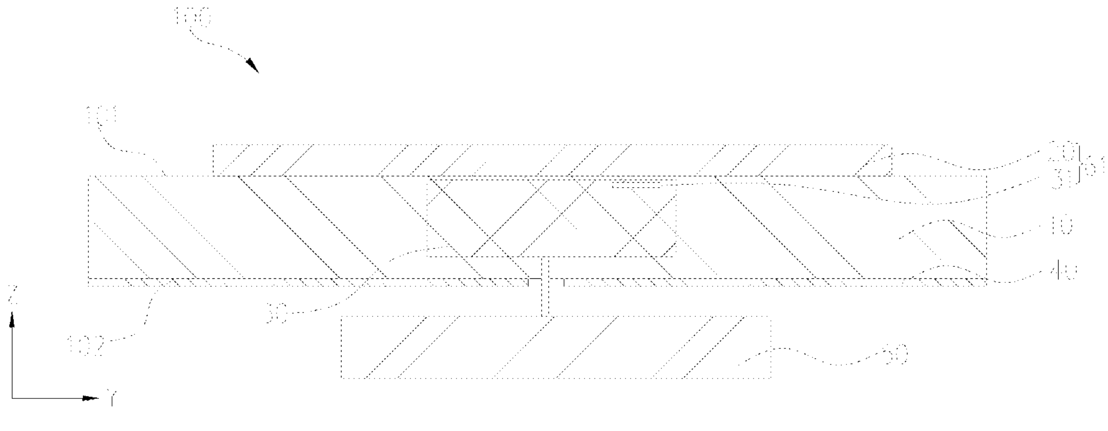
FIG. 6 is a schematic structural diagram of an antenna assembly in FIG. 2 provided in other implementations of the present disclosure.

Referring to FIG. 6, the matching structure 30 has one end electrically connected with the RF signal circuit 50, and the matching structure 30 has the other end that is close to the radiating patch 20 and is in capacitive coupling with the radiating patch 20. Specifically, the matching structure 30 is provided with a first coupling piece 31 at the other end of the matching structure 30, and the first coupling piece 31 and the radiating patch 20 are opposite to each other and form a first capacitor 61. The first coupling piece 31 and the radiating patch 20 form electrode pieces at two ends of the first capacitor 61, respectively. The first coupling piece 31 is parallel or substantially parallel to the radiating patch 20 in a thickness direction of the substrate 10 and there is a relatively small spacing between the first coupling piece 31 and the radiating patch 20. A first coupling capacitance is formed between the first coupling piece 31 and the radiating patch 20, and the first coupling piece 31 is coupled with and configured to feed the radiating patch 20, such that signal transmission between the first coupling piece 31 and the radiating patch 20 is realized.

The first coupling piece 31 is configured to feed the RF signal generated by the RF signal circuit 50 into the radiating patch 20, to excite the radiating patch 20 to generate multiple resonant modes. At least one resonant mode in the multiple resonant modes is generated by capacitive coupling between the first coupling piece 31 and the radiating patch 20. In other words, the first coupling piece 31 of the matching structure 30 serves as a feeding end, and the capacitive coupling that generates a resonant mode is further formed between the first coupling piece 31 and the radiating patch 20.

The number of resonant modes generated by the radiating patch 20 is not specifically limited in the present disclosure. The number of resonant modes generated by the capacitive coupling between the first coupling piece 31 and the radiating patch 20 is not specifically limited in the present disclosure. In implementations of the present disclosure, the capacitive coupling is formed between only one coupling piece (i.e., the first coupling piece 31) and the radiating patch 20, and in other implementations of the present disclosure, the capacitive coupling may be formed between two or more coupling pieces and the same radiating patch 20.

It can be understood that the antenna assembly 100 has a relatively small return loss in a band corresponding to a resonant mode, thereby increasing a transceiving efficiency of the antenna assembly 100. When the number of resonant modes of the antenna assembly 100 is increased, the band of the antenna assembly 100 with a relatively high transceiving efficiency is widened. In other words, an operating band or a coverage band or a supported band of the antenna assembly 100 is increased, and a bandwidth of the antenna assembly 100 is also widened.

In the antenna assembly 100 is provided in implementations of the present disclosure provides, the first coupling piece 31 of the matching structure 30 is in the capacitive coupling with the radiating patch 20, the radiating patch 20 is excited to generate the multiple resonant modes, and the at least one resonant mode of the multiple resonant modes is generated by coupling between the first coupling piece 31 and the radiating patch 20. In this way, the first coupling piece 31 is in the capacitive coupling with the radiating patch 20, such that the number of resonant modes generated by the radiating patch can be increased, a band of the antenna assembly 100 is widened, and an ultra wideband (UWB) of the antenna assembly 100 is realized, thereby improving the communication quality of the electronic device 1000.

A specific antenna type of the antenna assembly 100 is not limited in the present disclosure. In other words, the antenna assembly 100 may be a fourth-generation (4G) mobile communication antenna, a fifth-generation (5G) mobile communication antenna, a wireless fidelity (WiFi) antenna, a global positioning system (GPS) antenna, an UWB antenna, etc. In the present disclosure, for example, the antenna assembly 100 is the UWB antenna, and other antennas may be reasonably combined with reference to this implementation.

In a short-range positioning technology, a UWB positioning technology, as an emerging technology, has relatively good performance and positioning accuracy, and is suitable for indoor positioning. It is a very good choice to integrate the UWB positioning technology in the mobile terminal (i.e., a portable electronic device 1000) most commonly used indoors. However, an internal space of the mobile terminal is relatively narrow (e.g., miniaturization development of a mobile phone has strict requirements for the internal space of the mobile phone), so there are strict requirements for a thickness of the UWB antenna (i.e., extremely thin). Under strict antenna thickness requirements, it is difficult for the UWB antenna to maintain a wideband characteristic.

In the antenna assembly 100 provided in the present disclosure, the first coupling piece 31 of the matching structure is in the capacitive coupling with the radiating patch 20, the number of resonant modes is increased, which can effectively ensure that the UWB antenna is able to maintain an UWB on condition that UWB is extremely thin, and improve application reliability and communication performance of the UWB antenna in the electronic device 1000. When the antenna assembly 100 is the 4G mobile communication antenna, the 5G mobile communication antenna, the WiFi antenna, the GPS antenna, etc., application reliability and communication performance of these antennas in the electronic device 1000 may be improved.

When the antenna assembly 100 is the UWB antenna, the RF signal circuit 50 includes a UWB RF front-end module. The UWB RF front-end module is configured to enable the radiating patch 20 to transmit and receive extremely narrow pluses with nanoseconds or less to transfer data.

Figure 7:
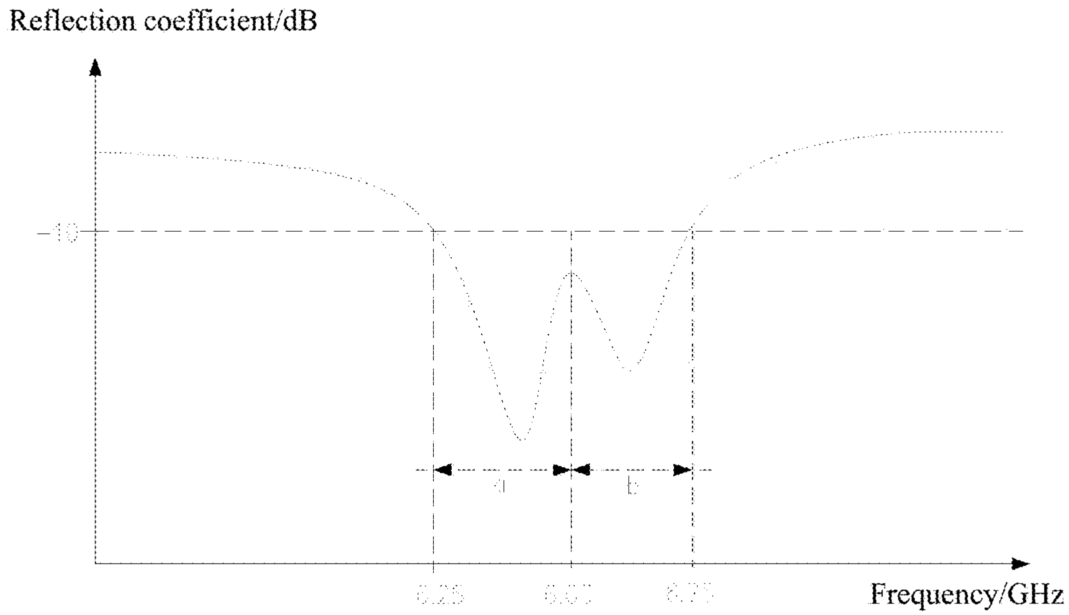
FIG. 7 is a curve graph of a reflection coefficient of an antenna assembly provided in implementations of the present disclosure.

In the present disclosure, referring to FIG. 7, the multiple resonant modes generated by the radiating patch 20 include a first resonant mode a and a second resonant mode b. The second resonant mode b is generated by the capacitive coupling between the first coupling piece 31 and the radiating patch 20. A band of the first resonant mode a is continuous with a band of the second resonant mode b. Reflection coefficient S11 of −10 dB is taken as a reference point, the band corresponding to the first resonant mode a at least partially overlaps the band corresponding to the second resonant mode b. The band corresponding to the first resonant mode a is a band of which a reflection coefficient is less than or equal to −10 dB. The band corresponding to the second resonant mode b is a band of which a reflection coefficient is less than or equal to −10 dB. In other implementations, reflection coefficient S11 of −8 dB, −9 dB, etc., may also be taken as the reference point. Optionally, a curve of a reflection coefficient of the first resonant mode a and a curve of a reflection coefficient of the second resonant mode b each are a downwardly-concave curve. An intersection of the curve of the reflection coefficient of the first resonant mode a and the curve of the reflection coefficient of the second resonant mode b is a peak point, and the reflection coefficient at the peak point is less than −10 dB.

For example, the reflection coefficient of −10 dB is taken as the reference point. The band corresponding to the first resonant mode a is 6.25~6.63 GHz, and the band corresponding to the second resonant mode b is 6.63~6.75 GHz, such that the reflection coefficient of the antenna assembly 100 in a range of 6.25~6.75 GHz is less than or equal to −10 dB, that is, the antenna assembly 100 is able to support a band of 6.25~6.75 GHz.

Optionally, the first resonant mode a may be one resonant mode, or a combination of multiple resonant modes.

Figure 8:
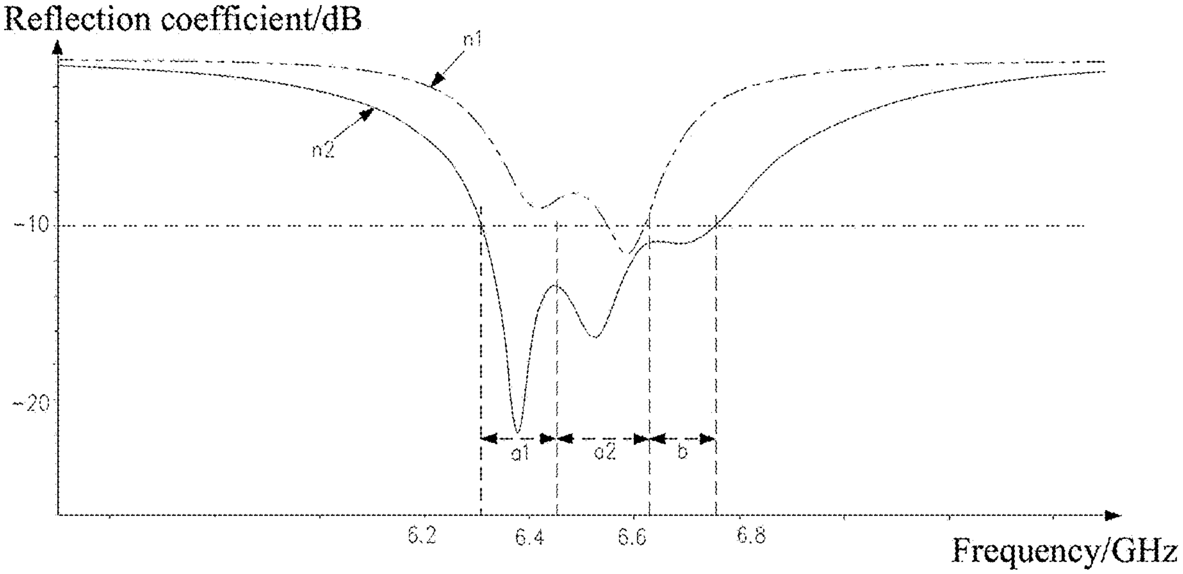
FIG. 8 is a curve graph of a reflection coefficient of an antenna assembly provided in other implementations of the present disclosure.

In an implementation, referring to FIG. 8, in FIG. 8, a curve n1 is a curve corresponding to the antenna assembly 100 being not provided with the matching structure 30, and a curve n2 is a curve corresponding to the antenna assembly 100 being provided with the matching structure 30. The first resonant mode a includes a first resonant sub-mode a1 and a second resonant sub-mode a2. The second resonant sub-mode a2 has a resonant frequency-point greater than the first resonant sub-mode a1. The second resonant sub-mode a2 may be adjacent to the first resonant sub-mode a1 or not. When the first resonant sub-mode a1 is adjacent to the second resonant sub-mode a2, the band of the second resonant sub-mode a2 may be continuous with the band of the first resonant sub-mode a1 or not.

It can be seen from comparison between the curve n1 and the curve n2 that in the present disclosure, the matching structure 30 is disposed on the radiating patch 20, and the first coupling piece 31 of the matching structure 30 is coupled with the radiating patch 20, such that not only a new resonant mode, i.e., the second resonant mode b, is generated, but also a reflection coefficient of a resonant band of the original first resonant sub-mode a1 and a reflection coefficient of a resonant band of the original second resonant sub-mode a2 are reduced, thereby widening an operating band of the original first resonant sub-mode a1 and an operating band of the original second resonant sub-mode a2. After the second resonant mode b is added, a continuous band formed by the first resonant sub-mode a1, the second resonant sub-mode a2, and the second resonant mode b is greatly widened.

In other implementations, the first resonant mode a may also include a combination of three, four, and other multiple resonant sub-modes.

Distribution forms of the first resonant sub-mode a1, the second resonant sub-mode a2, and the second resonant mode b provided in the present disclosure include, but are not limited to, following several implementations.

In a first resonant-mode-distribution implementation, referring to FIG. 8, a band of the first resonant sub-mode a1 is continuous with a band of the second resonant sub-mode a2, a resonant frequency-point of the second resonant mode b is greater than a resonant frequency-point of the second resonant sub-mode a2, and a band of the second resonant mode b is continuous with a band of the second resonant sub-mode a2. The resonant frequency-point of the second resonant mode b is close to the resonant frequency-point of the second resonant sub-mode a2.

In this implementation, the band of the first resonant sub-mode a1, the band of the second resonant sub-mode a2, and the band of the second resonant mode b are continuous in sequence to form a relatively wide operating band, thereby realizing the UWB of the antenna assembly 100.

For example, the reflection coefficient of −10 dB is taken as the reference point. The band corresponding to the first resonant sub-mode a1 is 6.25~6.44 GHz, the band corresponding to the second resonant sub-mode a2 is 6.44~6.63 GHz, and the band corresponding to the second resonant mode b is 6.63~6.75 GHz, such that the reflection coefficient of the antenna assembly 100 in a range of 6.25~6.75 GHz is less than or equal to −10 dB, that is, the antenna assembly 100 is able to support a band of 6.25~6.75 GHz.

Figure 9:
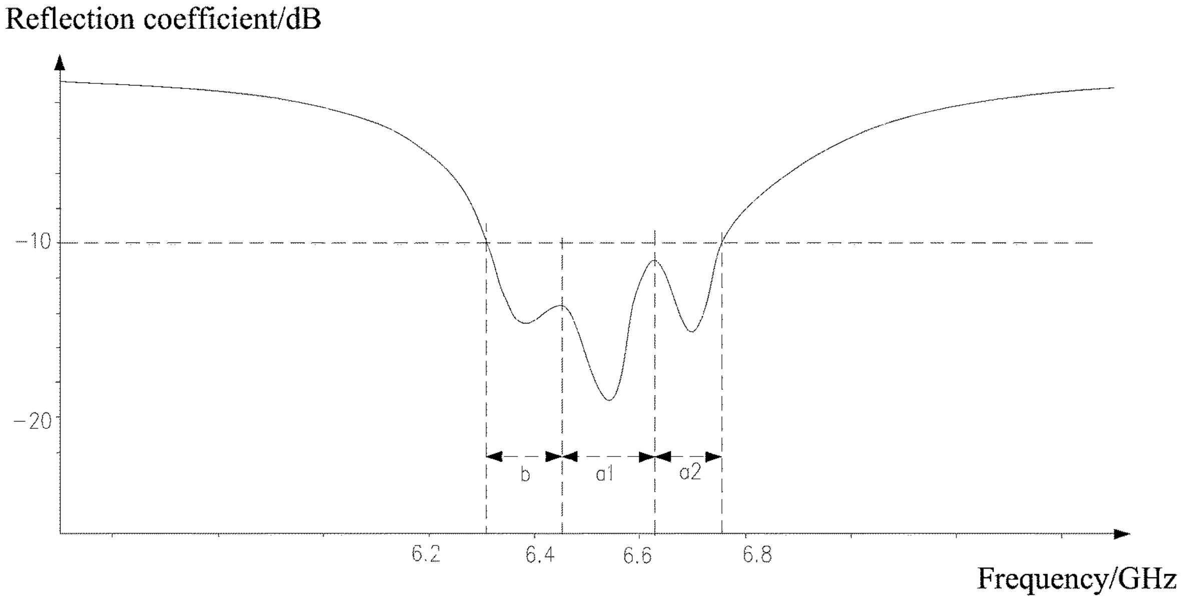
FIG. 9 is a curve graph of a reflection coefficient of an antenna assembly provided in other implementations of the present disclosure.

In a second resonant-mode-distribution implementation, referring to FIG. 9, a resonant frequency-point of the second resonant mode b is less than a resonant frequency-point of the first resonant sub-mode a1, and a band of the second resonant mode b is continuous with a band of the first resonant sub-mode a1. The resonant frequency-point of the second resonant mode b is close to the resonant frequency-point of the first resonant sub-mode a1.

In this implementation, the band of the second resonant mode b, the band of the first resonant sub-mode a1, and the band of the second resonant sub-mode a2 are continuous in sequence to form a relatively wide operating band, thereby realizing the UWB of the antenna assembly 100.

Figure 10:
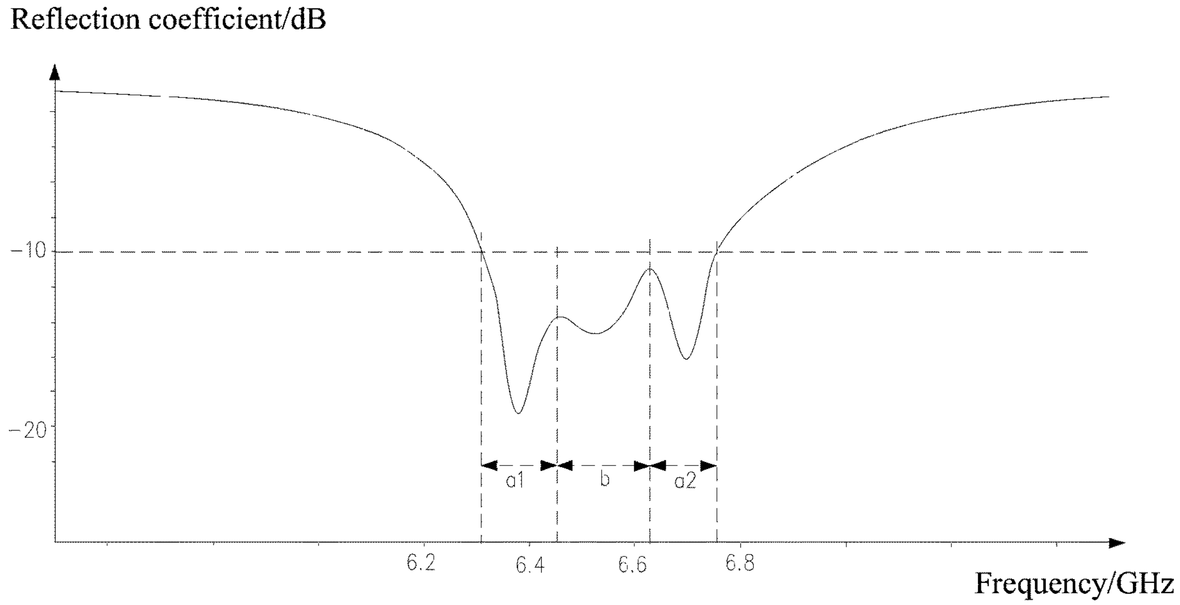
FIG. 10 is curve graph of a reflection coefficient of an antenna assembly provided in other implementations of the present disclosure.

In a third resonant-mode-distribution implementation, referring to FIG. 10, a resonant frequency-point of the second resonant mode b is greater than a resonant frequency-point of the first resonant sub-mode a1 and less than a resonant frequency-point of the second resonant sub-mode a2, and a band of the second resonant mode b is continuous with both a band of the first resonant sub-mode a1 and a band of the second resonant sub-mode a2.

In this implementation, the band of the first resonant sub-mode a1, the band of the second resonant mode b, and the band of the second resonant sub-mode a2 are continuous in sequence to form a relatively wide operating band, thereby realizing the UWB of the antenna assembly 100.

Optionally, a bandwidth supported by the first resonant mode a and the second resonant mode b is greater than or equal to 500M.

In this implementation, a band supported by the first resonant mode a and the second resonant mode b covers 6.25 GHz~6.75 GHz.

Figure 11:
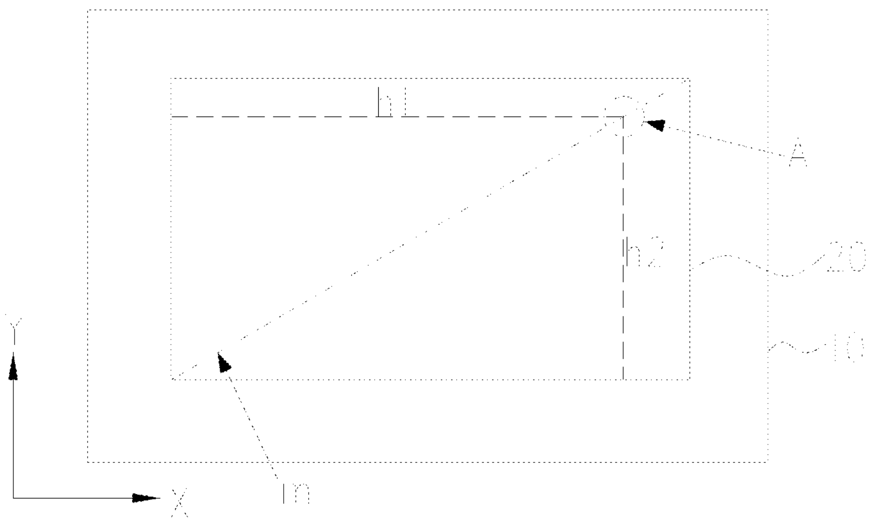
FIG. 11 is a schematic structural diagram of a feeding position on a radiating patch in the antenna assembly provided in FIG. 6.

Referring to FIG. 11, an orthographic projection region of the first coupling piece 31 on the radiating patch 20 is a feeding position A. The first coupling piece 31 is configured to feed a RF signal into the radiating patch 20 through the feeding position A. A position relationship between the first coupling piece 31 and the radiating patch 20 is not specifically limited in the present disclosure. The position relationship between the first coupling piece 31 and the radiating patch 20 provided in the present disclosure includes, but is not limited to, following implementations.

In an implementation, a distance between the feeding position A and an edge of the radiating patch 20 in a first-axis direction is greater than or less than a distance between the feeding position A and the edge of the radiating patch 20 in a second-axis direction. The first-axis direction intersects the second-axis direction.

In this implementation, a plane where the radiating patch 20 is disposed is plane XOY, and the thickness direction of the substrate 10 is a direction of axis Z. The first-axis direction is a forward direction of axis X, and the second-axis direction is a forward direction of axis Y Optionally, the radiating patch 20 is axisymmetric, that is, symmetric in the first-axis direction and the second-axis direction. In other words, a first axis and a second axis each are a symmetry axis of the present disclosure. In this implementation, the first-axis direction is perpendicular to the second-axis direction. Specifically, the radiating patch 20 is rectangular, elliptical, etc.

In the present disclosure, by setting a distance h1 between the feeding position A and the edge of the radiating patch 20 in the first-axis direction to be greater than or less than a distance h2 between the feeding position A and the edge of the radiating patch 20 in the second-axis direction, an effective electrical length of the feeding position A in the first-axis direction is different from an effective electrical length of the feeding position A in the second-axis direction, such that the radiating patch 20 forms different resonances in the first-axis direction and the second-axis direction, thereby making the radiating patch 20 generate the first resonant sub-mode a1 and the second resonant sub-mode a2.

It can be understood that a difference between the distance h1 between the feeding position A and the edge of the radiating patch 20 in the first-axis direction and the distance h2 between the feeding position A and the edge of the radiating patch 20 in the second-axis direction is less than or equal to 1 mm, such that the resonant frequency-point of the first resonant sub-mode a1 and the resonant frequency-point of the second resonant sub-mode a2 are close to each other, and then the band of the first resonant sub-mode a1 is continuous with the band of the second resonant sub-mode a2; or the band of the first resonant sub-mode a1, the band of the second resonant mode b, and the band of the second resonant sub-mode a2 are continuous in sequence to form a relatively wide bandwidth.

For example, the length of the radiating patch 20 may be, but is not limited to, 12.2 mm, and the width of the radiating patch 20 may be, but is not limited to, 11.85 mm. The resonant frequency-point of the first resonant sub-mode a1 and the resonant frequency-point of the second resonant sub-mode a2 each may be adjusted by adjusting the length of the radiating patch 20 and width of the radiating patch 20, such that the resonant frequency-point of the first resonant sub-mode a1 and the resonant frequency-point of the second resonant sub-mode a2 are adjusted to be in a band that needs to be supported. The length of the radiating patch 20 and the width of the radiating patch 20 may also be adjusted, such that the band of the first resonant sub-mode a1 is continuous with the band of the second resonant sub-mode a2, or there is a relatively small interval between the band of the first resonant sub-mode a1 and the band of the second resonant sub-mode a2, such that the band of the first resonant sub-mode a1, the band of the second resonant mode b, and the band of the second resonant sub-mode a2 are continuous in sequence.

Optionally, referring to FIG. 11, the radiating patch 20 is rectangular. The radiating patch 20 has a diagonal m. The diagonal m has a direction intersecting both the first-axis direction and the second-axis direction. The feeding position A is located on the diagonal m. A distance between the feeding position A and a central position of the radiating patch 20 in the direction of the diagonal m is greater than a distance between the feeding position A and the edge of the radiating patch 20 in the direction of the diagonal m. By setting the feeding position A to be close to the edge of the radiating patch 20, on the one hand, on condition that the radiating patch 20 has a certain size, the effective electrical length of the feeding position A in the first-axis direction and the effective electrical length of the feeding position A in the second-axis direction can be as long as possible, such that transmission and reception of a band required is realized, and the size of the radiating patch 20 can be reduced on condition that the transmission and reception of the band required is realized and a certain electrical length is met; and on the other hand, by setting the feeding position A to be close to the edge of the radiating patch 20, better impedance matching of the matching structure 30 for the radiating patch 20 can be realized.

In this implementation, there may be multiple radiating patches 20 and multiple matching structures 30, and the multiple radiating patches 20 are all disposed on the top surface 101 of the substrate 10. Each matching structure 30 is disposed corresponding to one radiating patch 20. The multiple matching structures 30 may be electrically connected with the same RF signal circuit 50 or electrically connected with different RF signal circuits 50. Optionally, the multiple radiating patch 20 may be arranged linearly in a direction of axis X, arranged linearly in a direction of axis Y, or arranged in an array in both the direction of axis X and the direction of axis Y, such that the antenna assembly 100 has a relatively good communication performance in the direction of axis X or the direction of axis Y. An arrangement direction of the multiple radiating patches 20 may also be deviated from axis X by 0~90°. For example, the arrangement direction of the multiple radiating patches 20 may also be deviated from axis X by 45°, such that the antenna assembly 100 has the relatively good communication performance in the direction of axis X or the direction of axis Y.

In another implementation, the distance between the feeding position A and the edge of the radiating patch 20 in the first-axis direction is equal to the distance between the feeding position A and the edge of the radiating patch 20 in the second-axis direction, such that the first resonant mode a is one resonant mode in which the antenna assembly 100 has a relatively high gain and a relatively good directivity, thereby improving the communication performance of the antenna assembly 100.

An equivalent circuit of the matching structure 30 is not specifically limited in the present disclosure. The equivalent circuit of the matching structure 30 provided in the present disclosure includes, but is not limited to, following implementations.

Figure 12:
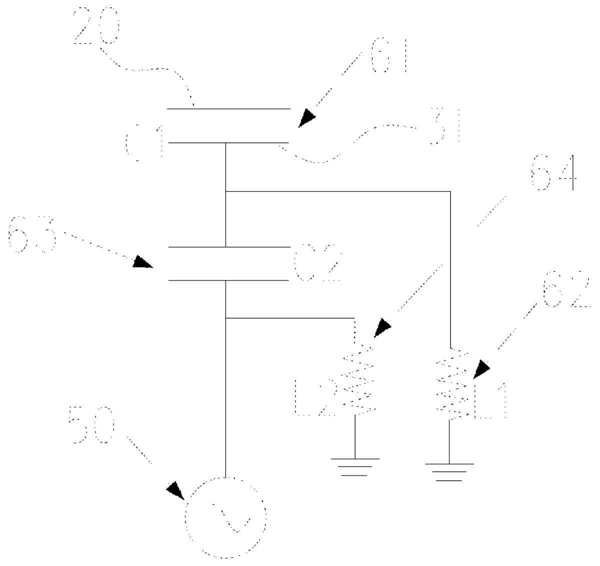
FIG. 12 is an equivalent circuit diagram of the antenna assembly provided in FIG. 6.

In this implementation, referring to FIG. 12, the first coupling piece 31 and the radiating patch 20 form the first capacitor 61, and the first capacitor 61 has a first coupling capacitance C1. The first capacitor 61 is configured to excite the radiating patch 20 to generate the second resonant mode b. The matching structure 30 further includes at least one of components such as a capacitor, an inductor, or etc. Optionally, components such as a capacitor, an inductor, etc., of the matching structure 30 may be connected in parallel or in series to form the matching structure 30. The matching structure 30 is configured to perform impedance matching on the radiating patch 20, and a resonant frequency-point of the second resonant mode b may be adjusted by adjusting a connection manner of the components such as the capacitor, the inductor, etc., of the matching structure 30. For example, the capacitor is disposed in the matching structure 30, such that the resonant frequency-point of the second resonant mode b is shifted towards a low band; and the inductor is disposed in the matching structure 30, such that the resonant frequency-point of the second resonant mode b is shifted towards a high band. In this way, the resonant frequency-point of the second resonant mode b is adjusted, such that the band of the first resonant sub-mode a1, the band of the second resonant sub-mode a2, and the band of the second resonant mode b are continuous in sequence, or the band of the second resonant mode b, the band of the first resonant sub-mode a1, and the band of the second resonant sub-mode a2 are continuous in sequence, or the band of the first resonant sub-mode a1, the band of the second resonant mode b, and the band of the second resonant sub-mode a2 are continuous in sequence, thereby realizing the UWB is realized.

In this implementation, referring to FIG. 12, the matching structure 30 further includes a first inductor 62. The first inductor 62 has a first inductance L1. The first inductor 62 has one end electrically connected with the first coupling piece 31 of the first capacitor 61, and the other end grounded. In this way, the first capacitor 61 and the first inductor 62 are connected in parallel.

Further, referring to FIG. 12, the matching structure 30 further includes a second capacitor 63. The second capacitor 63 has a second coupling capacitance C2. The second capacitor 63 has one end electrically connected with the first coupling piece 31 of the first capacitor 61, and the other end electrically connected with the RF signal circuit 50. In this way, the first capacitor 61 and the second capacitor 63 are connected in series. The RF signal of the RF signal circuit 50 is fed to the radiating patch 20 via the second capacitor 63 and the first capacitor 61.

Referring to FIG. 12, the matching structure 30 further includes a second inductor 64. The second inductor 64 has a second inductance L2. The second inductor 64 has one end electrically connected with one end of the second capacitor 63 away from the first capacitor 61, and the other end grounded. In this way, the second capacitor 63 and the second inductor 64 are connected in parallel.

The present disclosure includes, but is not limited to, the above equivalent circuit of the matching structure 30. In the present disclosure, it may also set that the first inductor 62 is connected with the first capacitor 61 in series, the first inductor 62 is connected with the second inductor 64 in series, the first capacitor 61 is connected with the second capacitor 63 in parallel, etc.

A forming structure of the capacitor and a forming structure of the inductor are not specifically limited in the present disclosure.

It can be understood that the first capacitor 61 includes, but is not limited to, two parallel or approximately parallel conductive layers/conductive pieces/conductive plates, and the two conductive plates are the first coupling piece 31 and the radiating patch 20, respectively. The second capacitor 63 includes, but is not limited to, two parallel or approximately parallel conductive layers/conductive pieces/conductive plates. The first inductor 62 includes, but is not limited to, at least one of a conductive pillar, a conductive line, or a conductive piece. The second inductor 64 includes, but is not limited to, at least one of a conductive pillar, a conductive line, or a conductive piece.

In the present disclosure, a specific structure of the first capacitor 61, a specific structure of the second capacitor 63, a specific structure of the first inductor 62, and a specific structure of the second inductor 64 include, but are not limited to, following implementations.

In an implementation, the first capacitor 61 is formed by the first coupling piece 31 and the radiating piece 20. The shape and size of the first coupling piece 31 and a spacing between the first coupling piece 31 and the radiating piece 20 are not limited in the present disclosure. In other words, the shape of the first coupling piece 31 includes, but is not limited to, a circle, a rectangle, a square, a triangle, etc. By adjusting an area of the first coupling piece 31 and the spacing between the first coupling piece 31 and the radiating patch 20, the first coupling capacitance C1 of the first coupling capacitor 61 may be adjusted, so as to adjust the resonant frequency-point of the second resonant mode b.

Figure 13:
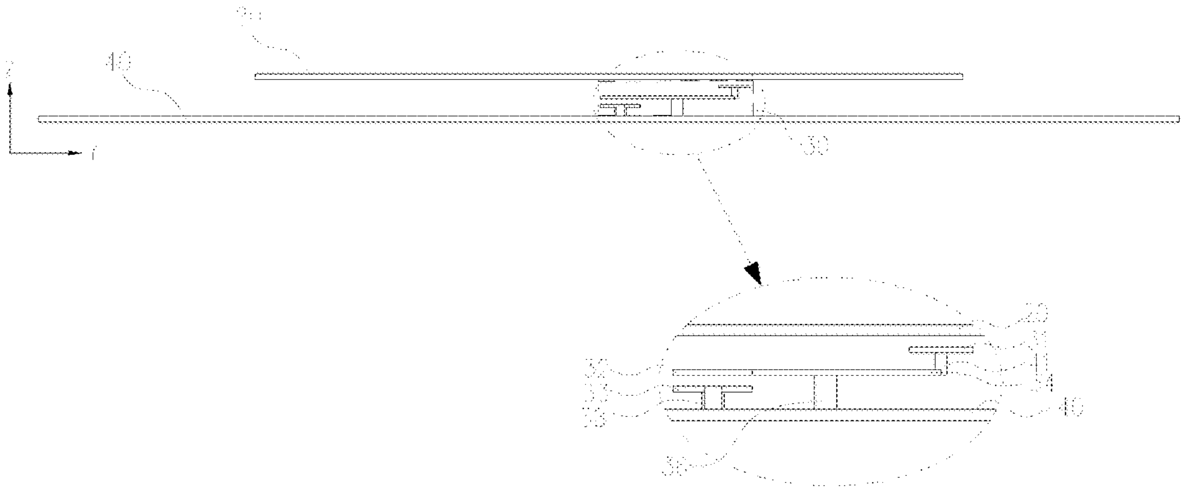
FIG. 13 is a partial schematic structural diagram of the antenna assembly provided in FIG. 6 from a first view angle.
Figure 14:
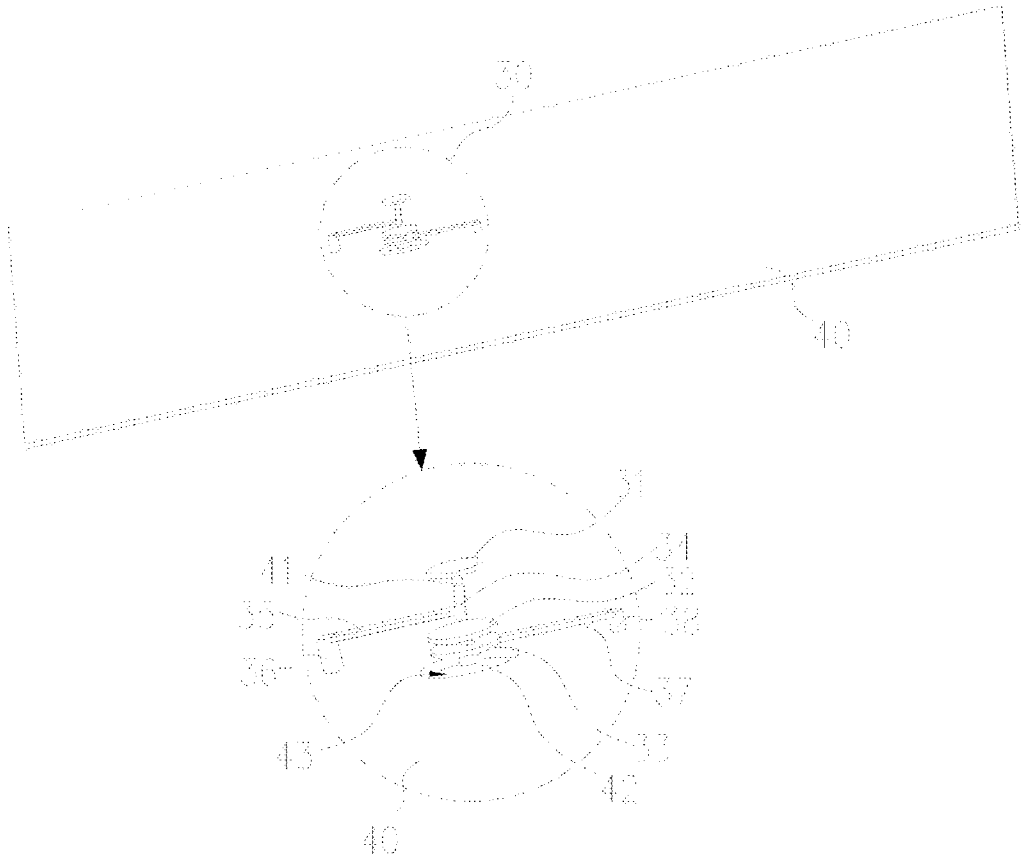
FIG. 14 is a partial schematic structural diagram of the antenna assembly provided in FIG. 6 from a second view angle.

Referring to FIG. 13 and FIG. 14, the second capacitor 63 includes a second coupling piece 32 and a third coupling piece 33 opposite to the second coupling piece 32. The second coupling piece 32 is disposed between the third coupling piece 33 and the radiating piece 20. A distance between the second coupling piece 32 and the radiating patch 20 is greater than a distance between the first coupling piece 31 and the radiating patch 20, such that an influence of the second coupling piece 32 on the radiating patch 20 is reduced.

Figure 15:
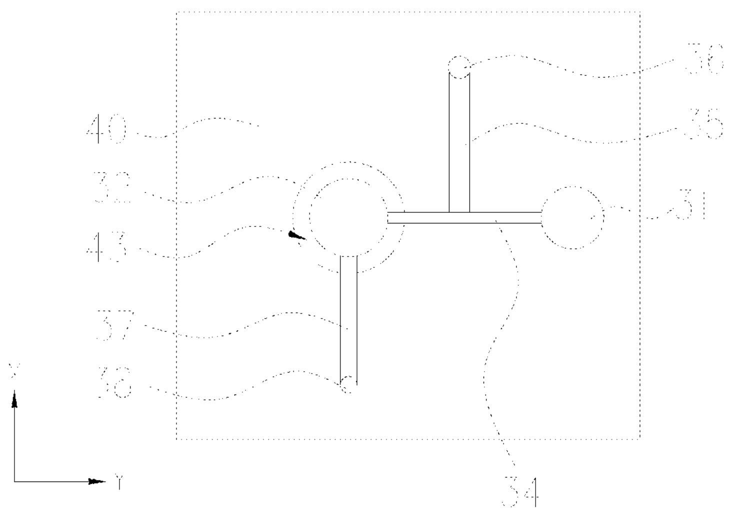
FIG. 15 is a partial schematic structural diagram of the antenna assembly provided in FIG. 6 from a third view angle.

Referring to FIG. 15, an orthographic projection of the second coupling piece 32 on the radiating patch 20 is spaced apart from an orthographic projection of the first coupling piece 31 on the radiating patch 20. In other words, the second coupling piece 32 and the first coupling piece 31 are disposed in a staggered manner in plane XOY, such that an influence of the second coupling piece 32 on the coupling effect between the first coupling piece 31 and the radiating patch 20 is reduced.

Accordingly, an area and a shape of the second coupling piece 32 and an area and a shape of the third coupling piece 33 each are not specifically limited in the present disclosure. A distance between the second coupling piece 32 and the third coupling piece 33 is not specifically limited in the present disclosure. By adjusting a facing area between the second coupling piece 32 and the third coupling piece 33 and the distance between the second coupling piece 32 and the third coupling piece 33, the capacitance of the second capacitor 63 can be adjusted, and then the impedance matching of the matching structure 30 for the radiating patch 20 is adjusted, so as to adjust the resonant frequency-point of the second resonant mode b.

Figure 16:
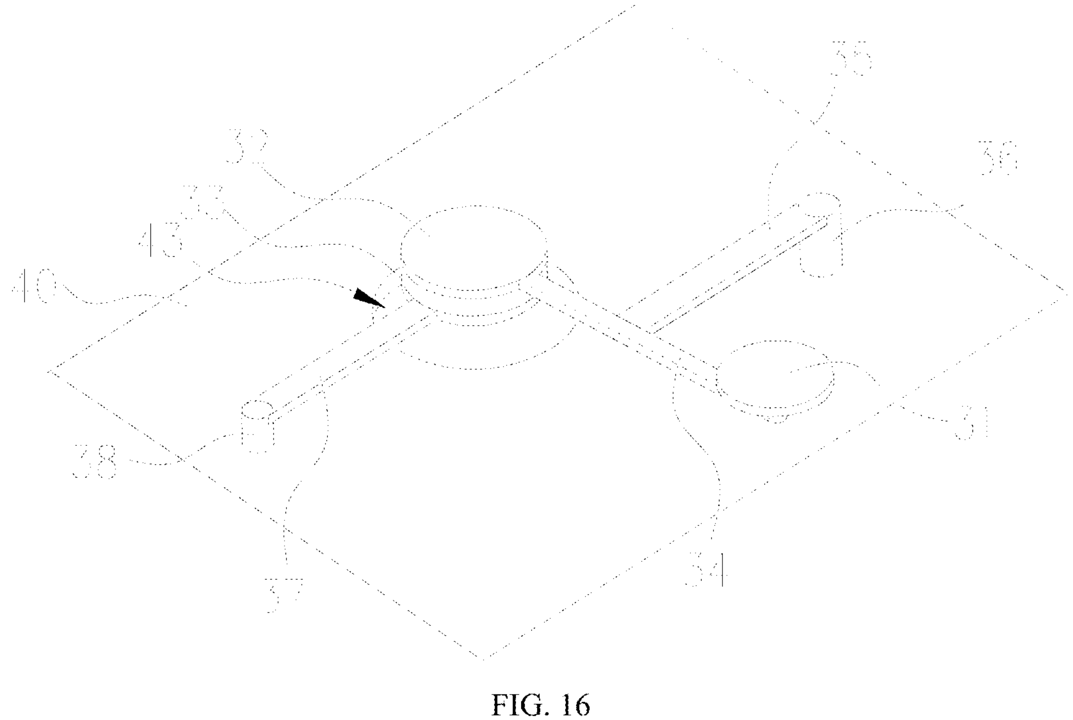
FIG. 16 is a partial schematic structural diagram of the antenna assembly provided in FIG. 6 from a fourth view angle.

Referring to FIG. 13 and FIG. 16, the matching structure 30 further includes a transmission line 34. The transmission line 34 is a conductive line. The transmission line 34 is electrically connected between the first coupling piece 31 and the second coupling piece 32, such that transmission of an electrical signal between the first coupling piece 31 and the second coupling piece 32 is realized.

Referring to FIG. 13 and FIG. 16, the first inductor 62 includes a first conductive line 35 and a first conductive pillar 36. The first conductive line 35 has one end electrically connected with the transmission line 34, and the first conductive line has the other end electrically connected with one end of the first conductive pillar 36. The other end of the first conductive pillar 36 is grounded. By adjusting a length and a width of the first conductive line 35, the inductance of the first inductor 62 can be adjusted, so as to realize the impedance matching of the matching structure 30 for the radiating patch 20.

Referring to FIG. 13 and FIG. 16, the second inductor 64 includes a second conductive line 37 and a second conductive pillar 38. The second conductive line 37 has one end electrically connected with the third coupling piece 33, and the second conductive line 37 has the other end electrically connected with one end of the second conductive pillar 38. The other end of the second conductive pillar 38 is grounded. By adjusting a length and a width of the second conductive line 37, the inductance of the second inductor 64 can be adjusted, so as to realize the impedance matching of the matching structure 30 for the radiating patch 20.

The matching structure 30 provided in the present disclosure includes the first coupling piece 31, and the first coupling piece 31 and the radiating patch 20 form the first capacitor 61 with a coupling capacitance, such that the radiating patch 20 generates the second resonant mode b. The matching structure 30 further includes the second capacitor 63 formed by the second coupling piece 32 and the third coupling piece 33, the first inductor 62 formed by the first conductive line 35 and the first conductive pillar 36, and the second inductor 64 formed by the second conductive line 37 and the second conductive pillar 38. The first capacitor 61 and the second capacitor 63 are disposed in a staggered manner, such that the first capacitor 61 and the second capacitor 63 do not affect each other, and the first capacitor 61 and the second capacitor 63 can be independently adjusted to adjust parameters of the matching structure 30. By adjusting the first coupling capacitance C1 of the first capacitor 61, the second coupling capacitance C2 of the second capacitor 63, the first inductance L1 of the first inductor 62, and the second inductance L2 of the second inductor 64, the parameters of the matching structure 30 can be effectively adjusted to adjust the resonant frequency-point of the second resonant mode b, such that the second resonant mode b is continuous with the first resonant sub-mode a1 and the second resonant sub-mode a2, and the UWB is formed.

In the present disclosure, the substrate 10 includes multiple dielectric layers. The reference ground layer 40 is disposed opposite to the radiating patch 20. The matching structure 30 is embedded in the substrate 10 and is disposed between the radiating patch 20 and the reference ground layer 40.

Figure 17:
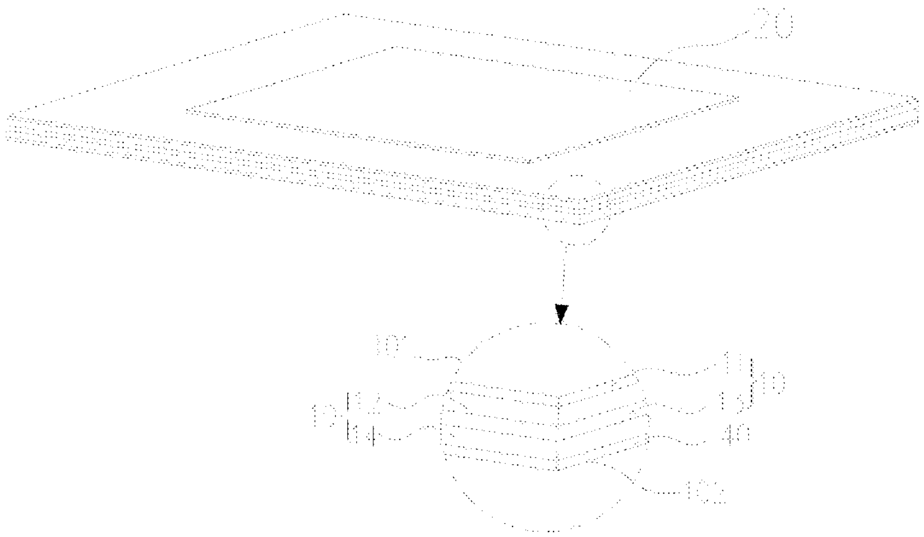
FIG. 17 is a schematic perspective view of the antenna assembly in FIG. 6.

In an implementation, referring to FIG. 17, the substrate 10 includes a first dielectric layer 11, a second dielectric layer 12, a third dielectric layer 13, and a fourth dielectric layer 14 that are stacked in sequence. The top surface 101 is a surface of the first dielectric layer 11 away from the second dielectric layer 12. The bottom surface 102 is a surface of the fourth dielectric layer 14 away from the third dielectric layer 13. Implementations in which the matching structure 30 is embedded in the substrate 10 include, but are not limited to, following implementations.

Optionally, referring to FIG. 14 and FIG. 17 together, the radiating patch 20 is disposed on the surface of the first dielectric layer 11 away from the second dielectric layer 12. The first coupling piece 31 is disposed on a surface of the second dielectric layer 12 away from the third dielectric layer 13. In other words, the radiating patch 20 is spaced apart from the first coupling piece 31 by the first dielectric layer 11, and the first dielectric layer 11 is made of an insulating material.

The second coupling piece 32, the transmission line 34, and the first conductive line 35 are disposed on a surface of the third dielectric layer 13 facing the second dielectric layer 12. The antenna assembly 100 further includes a first conductive portion 41 and a second conductive portion 42. The first conductive portion 41 penetrates through the second dielectric layer 12 and is electrically connected between the first coupling piece 31 and the transmission line 34.

The third coupling piece 33 and the second conductive line 37 are disposed on the surface of the fourth dielectric layer 14 facing the third dielectric layer 13.

The first conductive pillar 36 has one end electrically connected with the first conductive line 35, and the first conductive pillar 36 has the other end that penetrates through the third dielectric layer 13 and the fourth dielectric layer 14 and is electrically connected with the reference ground layer 40.

The second conductive pillar 38 has one end electrically connected with the second conductive line 37, and the second conductive pillar 38 has the other end that penetrates through the fourth dielectric layer 14 and is electrically connected with the reference ground layer 40.

The reference ground layer 40 defines a through hole 43. The second conductive portion 42 has one end electrically connected with the third coupling piece 33, and the second conductive portion 42 has the other end that penetrates through the through hole 43 and is electrically connected with the RF signal circuit 50 (with reference to FIG. 5).

During manufacturing of the antenna assembly 100, the reference ground layer 40 is disposed on one surface of the fourth dielectric layer 14, and the reference ground layer 40 defines the through hole 43; the second conductive pillar 38 and the second conductive portion 42 each penetrate through the fourth dielectric layer 14, one end of the first conductive pillar 36 is electrically connected with the reference ground layer 40, and one end of the second conductive portion 42 penetrates through the through hole 43 and is electrically connected with the RF signal circuit 50; the second conductive pillar 38 and the second conductive portion 42 each are, but are not limited to, a metalized via hole or a metalized side wall; the third coupling piece 33 and the second conductive line 37 are disposed on the other surface of the fourth dielectric layer 14, the third coupling piece 33 covers one end of the second conductive portion 42 and is electrically connected with the second conductive portion 42, and the second conductive line 37 is electrically connected with the third coupling piece 33 and one end of the second conductive pillar 38; the third dielectric layer 13 is disposed on the third coupling piece 33 and the second conductive line 37, the first conductive pillar 36 penetrates through the third dielectric layer 13 and the fourth dielectric layer 14, and one end of the first conductive pillar 36 is electrically connected with the reference ground layer 40; the second coupling piece 32, the transmission line 34, and the first conductive line 35 are disposed on the third dielectric layer 13, one end of the first conductive line 35 is electrically connected with the other end of the first conductive pillar 36, the other end of the first conductive line 35 is electrically connected with the transmission line 34 at the middle of the transmission line 34, one end of the transmission line 34 is electrically connected with the second coupling piece 32, and the second coupling piece 32 is opposite to the third coupling piece 33; the second dielectric layer 12 is disposed on the second coupling piece 32, the transmission line 34, and the first conductive line 35, the first conductive portion 41 is disposed on the second dielectric layer 12 and penetrates through the second dielectric layer 12, one end of the first conductive portion 41 is electrically connected with one end of the transmission line 34, the first coupling piece 31 is disposed on the second dielectric layer 12, and the first coupling piece 31 covers the other end of the first conductive portion 41; and the first dielectric layer 11 is disposed on the first coupling piece 31, and the radiating patch 20 is disposed on the first dielectric layer 11.

Optionally, the reference ground layer 40, the first conductive portion 41, the second conductive portion 42, the first conductive pillar 36, the first conductive line 35, the second conductive pillar 38, the second conductive line 37, the first coupling piece 31, the second coupling piece 32, the third coupling piece 33, and the radiating patch 20 each are a metal conductive layer, such as metal copper, etc., and a forming manner thereof includes, but is not limited to, printing, etc. The first dielectric layer 11, the second dielectric layer 12, the third dielectric layer 13, and the fourth dielectric layer 14 each are made of an insulating material.

In the present disclosure, the matching structure 30 is integrated into the substrate 10 having multiple dielectric layers to form multiple matching structures, thereby realizing effective integration of the matching structure 30 and the multiple dielectric layers. The matching structure 30 has sufficient arrangement space in plane XOY, such that the thickness of the matching structure 30 in the direction of axis Z is reduced, and the antenna assembly 100 is light and thin.

Optionally, a sum of a thickness of the radiating patch 20, a thickness of the substrate 10, and a thickness of the reference ground layer 40 in the direction of axis Z is less than or equal to 0.3~0.5 mm. For example, the sum of the thickness of the radiating patch 20, the thickness of the substrate 10, and the thickness of the reference ground layer 40 in the direction of axis Z is 0.38 mm. The matching structure 30 is disposed in multiple dielectric layers, such that the antenna assembly 100 has a relatively small thickness, and can support a relatively wide bandwidth.

The matching structure 30 is embedded in the multilayer substrate 10, the coupling capacitance of the first capacitor 61 can be adjusted by adjusting an area of the first coupling piece 31, the coupling capacitance of the second capacitor 63 can be adjusted by adjusting the facing area between the second coupling piece 32 and the third coupling piece 33, the inductance of the first inductor 62 can be adjusted by adjusting the length and the width of the first conductive line 35, and the inductance of the second inductor 64 can be adjusted by adjusting the length and the width of the second conductive line 37. All the above adjustments can be made in plane XOY, such that the sum of the thickness of the radiating patch 20, the thickness of the substrate 10, and the thickness of the reference ground layer 40 in the direction of axis Z is not increased. In other words, in the present disclosure, the matching structure 30 is embedded in the multilayer substrate 10, such that not only can the resonant frequency-point of the second resonant mode b be adjusted to make the second resonant mode b continuous with the first resonant sub-mode a1 and the second resonant sub-mode a2 and realize the UWB, but also the thickness of the substrate 10 is not increased while the area of the coupling piece, the length and the width of the first conductive line 35, and the length and the width of the second conductive line 37 need to be increased. In this way, the UWB is realized on condition that the antenna assembly 100 is extremely thin, and a problem that it is difficult for the UWB antenna to maintain a wideband characteristic due to relatively narrow internal space of the electronic device 1000 and strict requirement for the thickness of the UWB antenna is effectively solved.

When a UWB positioning system is applied to the current electronic device 1000, there are very high requirements for the thickness of the UWB antenna. According to the present disclosure, it is proposed that requirements for a complete bandwidth of 6.25 GHz~6.75 GHz of the UWB positioning are met with a small thickness. In the present disclosure, on a multilayer dielectric substrate 10, a bandwidth of a conventional UWB antenna is greatly widened by using a multilayer matching structure.

In the present disclosure, the first coupling piece 31 is coupled with and configured to feed the radiating patch 20, such that the multilayer matching structure and the first coupling capacitance C1 between the first coupling piece 31 and the radiating patch 20 can form an additional resonant frequency-point of the second resonant mode b, as illustrated by curve n2 in FIG. 8.

Figure 18:
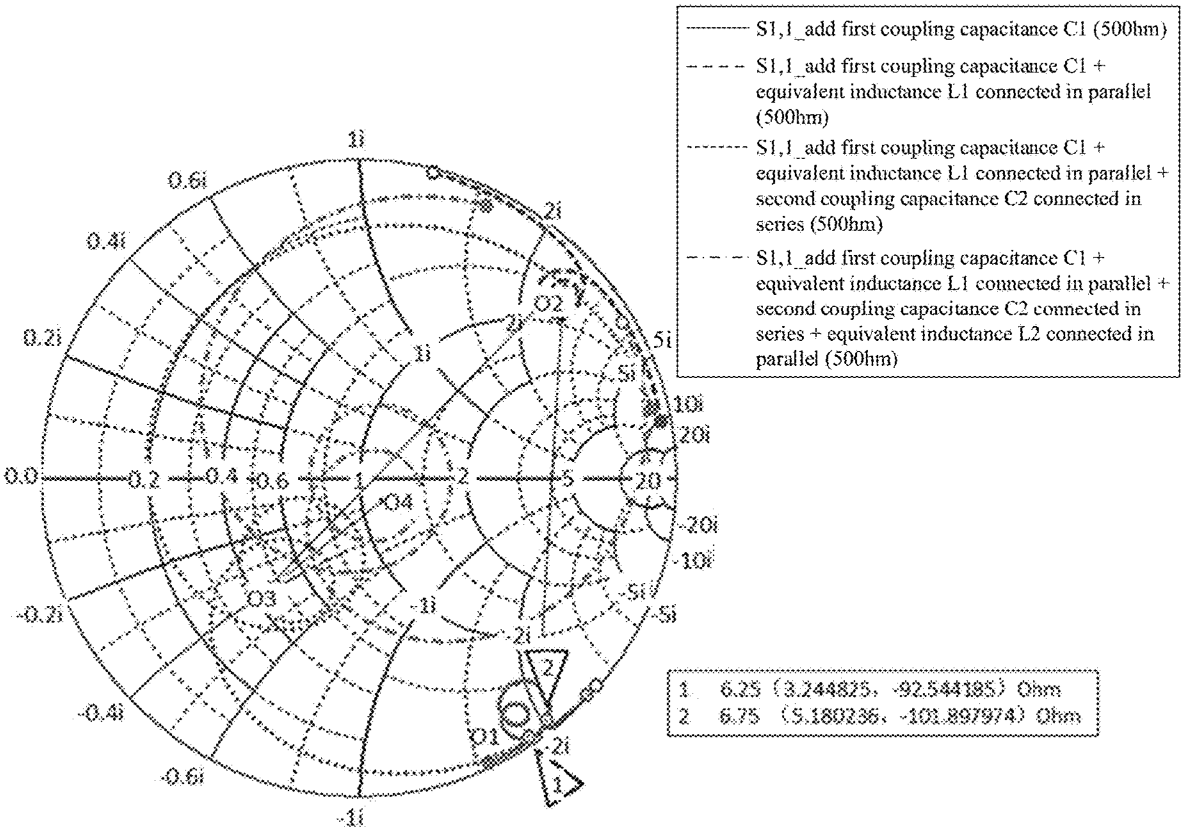
FIG. 18 is a Smith chart of the antenna assembly corresponding to FIG. 8.

Referring to FIG. 18, FIG. 18 is a Smith chart of the antenna assembly corresponding to FIG. 8. A specific process for realizing a wideband is as illustrated in the Smith chart in FIG. 18. When only the first coupling capacitance C1 is utilized to feed, S-parameters of the antenna are located at the lower right (position O1) of the Smith chart; when the equivalent inductance L1 is formed by the first conductive line 35 and the first conductive pillar 36, and the equivalent inductance L1 is connected with the first coupling capacitance C1 in parallel, a curve of S-parameters can be moved to the upper right corner (position O2) of the Smith chart; when the second capacitive coupling C2 between the second coupling piece 32 and the third coupling piece 33 is connected with the first coupling capacitance C1 in series, the curve of the S-parameters can be moved to the lower left of the Smith chart (position O3); and in this case, when the equivalent inductance L2 is formed by the second conductive line 37 and the second conductive pillar 38 and the equivalent inductance L2 is connected with the second capacitive coupling C2 in parallel, the curve of S-parameters can be moved to the vicinity of the center point (position O4) of the Smith chart to form good matching, such as a curve of a reflection coefficient of the antenna assembly 100 in FIG. 8. FIG. 8 illustrates a curve of a reflection coefficient of the antenna assembly 100 with the multilayer matching structure. It can be seen that the reflection coefficient is less than −6.5 dB in 6.25~6.85 GHz, which completely meets requirements of the antenna assembly 100 for wideband positioning.

Figure 19:
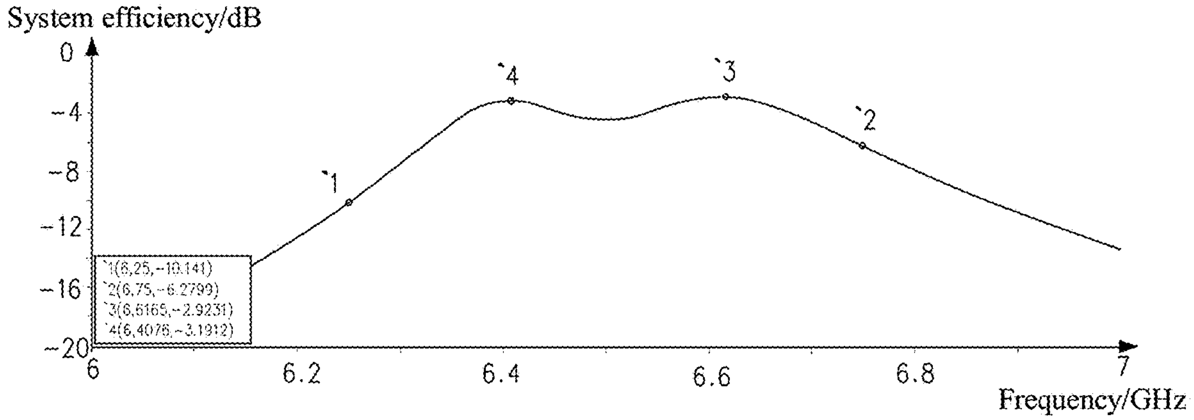
FIG. 19 is a diagram of a system efficiency of the antenna assembly corresponding to FIG. 8.

Referring to FIG. 19, FIG. 19 is a system efficiency curve of the antenna assembly corresponding to FIG. 8. In the UWB positioning system, there are also high requirements for a system efficiency of the antenna assembly 100. The system efficiency of the antenna assembly 100 is provided in FIG. 19. In 6.25~6.75 GHz, the efficiency is about −10.1~2.9 dB, and an average efficiency is about −5.2 dB. Generally, when the system efficiency is about −7 dB, the antenna assembly 100 has a relatively good radiation performance, and when an absolute value of the system efficiency is less than 7, the radiation performance is better. Therefore, the system efficiency in the present disclosure is −5.2 dB, which indicates that the antenna assembly 100 has the relatively good radiation performance.

Referring to FIG. 8, the resonant frequency-point of the first resonant sub-mode a1 is 6.38 GHz, the resonant frequency-point of the second resonant sub-mode a2 is 6.54 GHz, and the resonant frequency-point of the second resonant mode b is 6.72 GHz.

Figure 20:
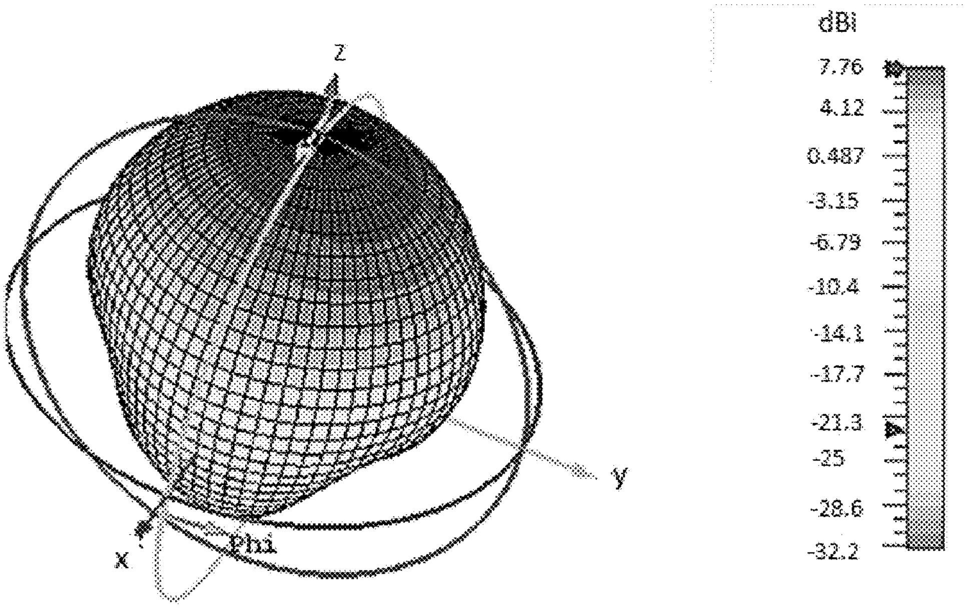
FIG. 20 is a far-field pattern of the antenna assembly corresponding to FIG. 8 at a resonant frequency-point of 6.38 GHz of a first resonant sub-mode.
Figure 21:
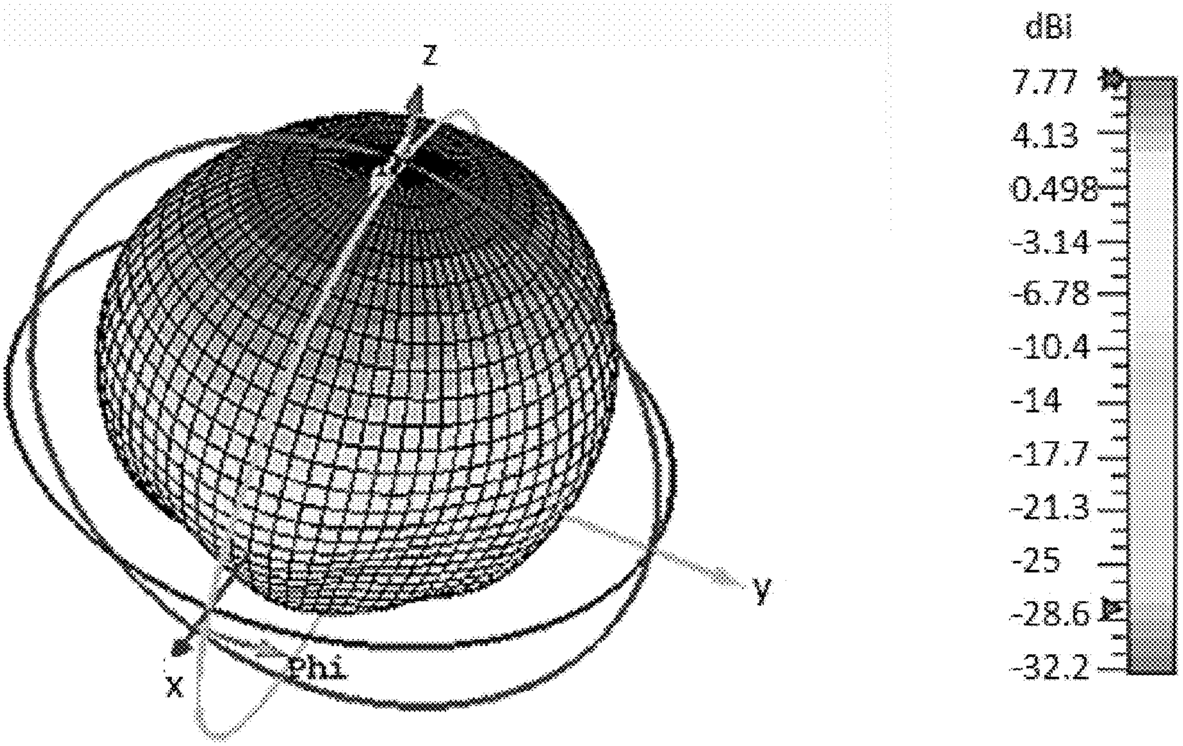
FIG. 21 is a far-field pattern of the antenna assembly corresponding to FIG. 8 at a resonant frequency-point of 6.54 GHz of a second resonant sub-mode.
Figure 22:
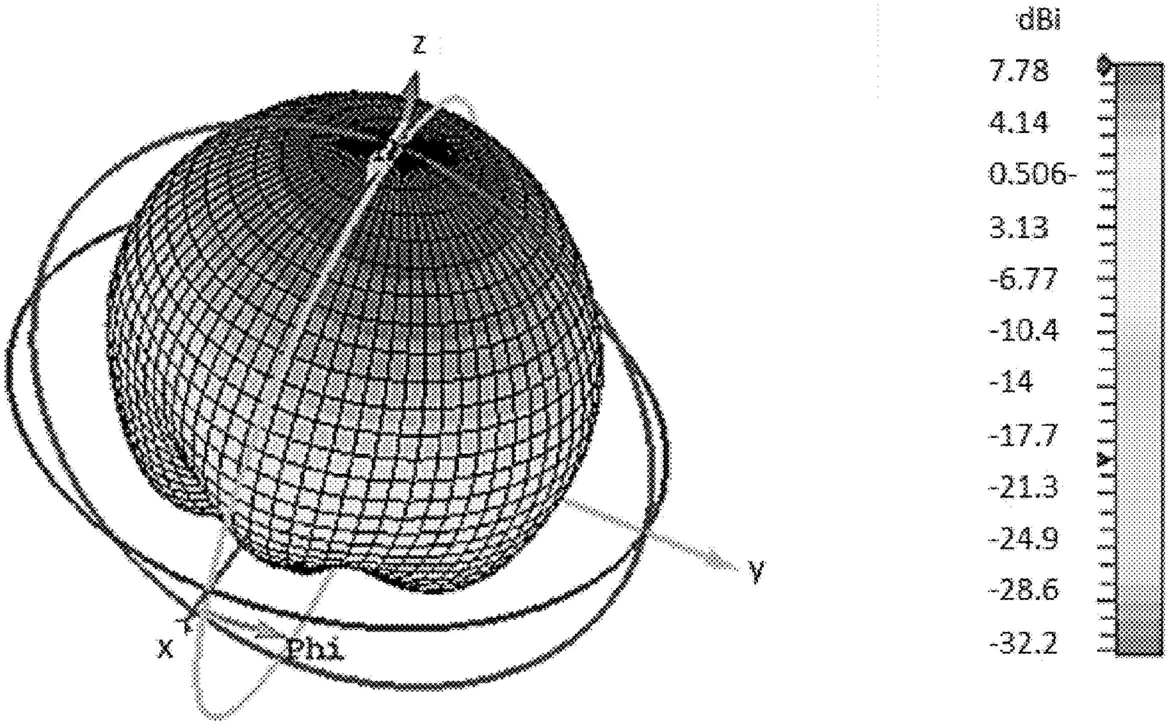
FIG. 22 is a far-field pattern of the antenna assembly corresponding to FIG. 8 at a resonant frequency-point of 6.72 GHz of a second resonant mode.

Referring to FIG. 20, FIG. 20 is a far-field pattern of the antenna assembly corresponding to FIG. 8 at the resonant frequency-point of the first resonant sub-mode a1. Referring to FIG. 21, FIG. 21 is a far-field pattern of the antenna assembly corresponding to FIG. 8 at the resonant frequency-point of the second resonant sub-mode a2. Referring to FIG. 22, FIG. 22 is a far-field pattern of the antenna assembly corresponding to FIG. 8 at a resonant frequency-point of a third first resonant mode b.

As can be seen from the far-field pattern of the antenna assembly 100 at the resonant frequency-point of the first resonant sub-mode a1, the far-field pattern of the antenna assembly 100 at the resonant frequency-point of the second resonant sub-mode a2, and the far-field pattern of the antenna assembly 100 at the resonant frequency-point of the second resonant mode b, a directivity value of the antenna assembly 100 at the resonant frequency-point of the first resonant sub-mode a1 is 7.76 dBi, a directivity value of the antenna assembly 100 at the resonant frequency-point of the second resonant sub-mode a2 is 7.77 dBi, and a directivity value of the resonant frequency-point of the second resonant mode b of the antenna assembly 100 is 7.78 dBi. The above indicates that the directivity of the antenna assembly 100 is very stable, the directivity value of the antenna assembly is about 7.77 dBi, a radiation intensity of the antenna assembly 100 in axis X of the far-field pattern is similar to a radiation intensity of the antenna assembly 100 in axis Y of the far-field pattern, and the antenna assembly 100 also has a certain radiation intensity in a large angle direction, such that the requirements of the antenna assembly 100 are met.

In this scheme, by utilizing the multilayer dielectric substrate 10 as the matching structure of the antenna assembly 100, wideband requirements of the antenna assembly 100 are met, and additional matching structures, such as some lumped elements, between the RF signal circuit 50 and the radiating patch 20 are avoided, such that the structure of the antenna assembly 100 can be simplified, miniaturization and lightening and thinning of the antenna assembly 100 can be promoted, and the power consumption can be reduced by reducing the number of components. In the meanwhile, the thickness of the antenna assembly 100 is not increased when using the multilayer matching structure, which meets present strict requirements of mobile devices, such as mobile phones, for the thickness of the antenna assembly 100.

In the present disclosure, by utilizing a process of the multilayer dielectric substrate 10, an equivalent inductor and an equivalent capacitor are formed on the multilayer dielectric substrate 10 with the aid of the conductive line, the conductive pillar, and the coupling piece, such that the resonant frequency-point of the second resonant mode b of the antenna assembly 100 is excited, thereby widening the bandwidth of an original antenna assembly 100, and effectively solving a problem of an excessively narrow antenna bandwidth.

The above are some implementations of the present disclosure, and it should be noted that those of ordinary skill in the art may further make improvements and modifications without departing from the principle of the present disclosure, and these improvements and modifications shall also belong to the scope of protection of the present disclosure.

What is claimed is:

1. An antenna assembly comprising:

a substrate;

a radiating patch disposed on the substrate; and a matching structure, wherein the matching structure is configured to be electrically connected with a radio frequency (RF) signal circuit at one end of the matching structure, the matching structure comprises a first coupling piece at another end of the matching structure, the first coupling piece is in capacitive coupling with the radiating patch, and the first coupling piece is configured to feed a RF signal generated by the RF signal circuit into the radiating patch, to excite the radiating patch to generate a plurality of resonant modes, wherein at least one resonant mode in the plurality of resonant modes is generated by the capacitive coupling between the first coupling piece and the radiating patch.

2. The antenna assembly of claim 1, wherein the plurality of resonant modes comprise a first resonant mode and a second resonant mode, the second resonant mode is generated by the capacitive coupling between the first coupling piece and the radiating patch, and a band of the first resonant mode is continuous with a band of the second resonant mode.

3. The antenna assembly of claim 2, wherein the first resonant mode comprises a first resonant sub-mode and a second resonant sub-mode, and the second resonant sub-mode has a resonant frequency-point greater than the first resonant sub-mode; and wherein a band of the first resonant sub-mode, a band of the second resonant sub-mode, and the band of the second resonant mode are continuous in sequence; or the band of the second resonant mode, the band of the first resonant sub-mode, and the band of the second resonant sub-mode are continuous in sequence; or the band of the first resonant sub-mode, the band of the second resonant mode, and the band of the second resonant sub-mode are continuous in sequence.

4. The antenna assembly of claim 2, wherein a bandwidth supported by the first resonant mode and the second resonant mode is greater than or equal to 500M.

5. The antenna assembly of claim 2, wherein a band supported by the first resonant mode and the second resonant mode covers 6.25 GHz~6.75 GHz.

6. The antenna assembly of claim 1, wherein an orthographic projection region of the first coupling piece on the radiating patch is a feeding position, a distance between the feeding position and an edge of the radiating patch in a first-axis direction is greater than or less than a distance between the feeding position and the edge of the radiating patch in a second-axis direction, and the first-axis direction intersects the second-axis direction.

7. The antenna assembly of claim 6, wherein a difference between the distance between the feeding position and the edge of the radiating patch in the first-axis direction and the distance between the feeding position and the edge of the radiating patch in the second-axis direction is less than or equal to 1 mm.

8. The antenna assembly of claim 6, wherein the radiating patch has a diagonal, and the diagonal has a direction intersecting both the first-axis direction and the second-axis direction; and the feeding position is located on the diagonal, and a distance between the feeding position and a central position of the radiating patch along the diagonal is greater than a distance between the feeding position and the edge of the radiating patch along the diagonal.

9. The antenna assembly of claim 1, wherein the first coupling piece is in the capacitive coupling with the radiating patch to form a first capacitor, the matching structure further comprises a first inductor, and the first inductor has one end electrically connected with the first coupling piece of the first capacitor, and another end grounded.

10. The antenna assembly of claim 9, wherein the matching structure further comprises a second capacitor, and the second capacitor has one end electrically connected with the first coupling piece, and another end electrically connected with the RF signal circuit.

11. The antenna assembly of claim 10, wherein the matching structure further comprises a second inductor, the second inductor has one end electrically connected with another end of the second capacitor, and the second inductor has the other end grounded.

12. The antenna assembly of claim 11, wherein the second capacitor comprises a second coupling piece and a third coupling piece opposite to the second coupling piece, the second coupling piece is disposed between the third coupling piece and the radiating patch, and an orthographic projection of the second coupling piece on the radiating patch is spaced apart from an orthographic projection of the first coupling piece on the radiating patch; and the matching structure further comprises a transmission line electrically connected between the first coupling piece and the second coupling piece.

13. The antenna assembly of claim 12, wherein a distance between the second coupling piece and the radiating patch is greater than a distance between the first coupling piece and the radiating patch.

14. The antenna assembly of claim 12, wherein the first inductor comprises a first conductive line and a first conductive pillar, the first conductive line has one end electrically connected with the transmission line, the first conductive line has another end electrically connected with one end of the first conductive pillar, and another end of the first conductive pillar is grounded.

15. The antenna assembly of claim 14, wherein the second inductor comprises a second conductive line and a second conductive pillar, the second conductive line has one end electrically connected with the third coupling piece, the second conductive line has another end electrically connected with one end of the second conductive pillar, and another end of the second conductive pillar is grounded.

16. The antenna assembly of claim 15, further comprising a reference ground layer; wherein the substrate comprises a top surface and a bottom surface opposite to the top surface, the radiating patch is disposed on the top surface, the reference ground layer is disposed on the bottom surface, the reference ground layer is disposed opposite to the radiating patch, and the matching structure is embedded in the substrate and is disposed between the radiating patch and the reference ground layer.

17. The antenna assembly of claim 16, wherein the substrate comprises a first dielectric layer, a second dielectric layer, a third dielectric layer, and a fourth dielectric layer that are stacked in sequence, the top surface is a surface of the first dielectric layer away from the second dielectric layer, and the bottom surface is a surface of the fourth dielectric layer away from the third dielectric layer;

wherein the first coupling piece is disposed on the second dielectric layer;

wherein the second coupling piece, the transmission line, and the first conductive line are disposed on the third dielectric layer; and the antenna assembly further comprises a first conductive portion and a second conductive portion, and the first conductive portion penetrates through the second dielectric layer and is electrically connected between the first coupling piece and the transmission line;

wherein the third coupling piece and the second conductive line are disposed on the fourth dielectric layer;

wherein said one end of the first conductive pillar is electrically connected with the first conductive line, and another end of the first conductive pillar penetrates through the third dielectric layer and the fourth dielectric layer and is electrically connected with the reference ground layer;

wherein said one end of the second conductive pillar is electrically connected with the second conductive line, and another end of the second conductive pillar penetrates through the fourth dielectric layer and is electrically connected with the reference ground layer; and wherein the reference ground layer defines a through hole, the second conductive portion has one end electrically connected with the third coupling piece, and the second conductive portion has another end penetrating through the through hole and electrically connected with the RF signal circuit.

18. The antenna assembly of claim 16, wherein a sum of a thickness of the radiating patch, a thickness of the substrate, and a thickness of the reference ground layer is less than or equal to 0.3~0.5 mm.

19. The antenna assembly of claim 1, further comprising the RF signal circuit, wherein the RF signal circuit is disposed at one side of the substrate away from the radiating patch, and the RF signal circuit comprises an ultra wideband (UWB) RF front-end module.

20. An electronic device comprising an antenna assembly, wherein the antenna assembly comprises:

a substrate;

a radiating patch disposed on the substrate; and a matching structure, wherein the matching structure is configured to be electrically connected with a radio frequency (RF) signal circuit at one end of the matching structure, the matching structure comprises a first coupling piece at another end of the matching structure, the first coupling piece is in capacitive coupling with the radiating patch, and the first coupling piece is configured to feed a RF signal generated by the RF signal circuit into the radiating patch, to excite the radiating patch to generate a plurality of resonant modes, wherein at least one resonant mode in the plurality of resonant modes is generated by the capacitive coupling between the first coupling piece and the radiating patch.

* * * * *